United States Patent Office 3,099,638
Patented July 30, 1963

3,099,638
RESINOUS GLYCIDYL POLYETHER COMPOSITIONS
Newton C. Foster, Pittsburgh, Pa., assignor to Westinghouse Electric Corporation, East Pittsburgh, Pa., a corporation of Pennsylvania
No Drawing. Filed Dec. 28, 1959, Ser. No. 862,028
6 Claims. (Cl. 260—45.5)

The present invention relates to resinous glycidyl polyether compositions and to products produced therefrom.

Glycidyl polyethers, also known as epoxy resins and poly epoxides, have excellent chemical resistance, low moisture permeability, and superior adhesive properties, all of which make said resins particularly well suited for use as adhesive sealing compositions, casting resins, and surface coatings.

Liquid, completely reactive glycidyl polyethers undergo little shrinkage when cured to solid resinous bodies. As a result, they may be cast about electronic components with a minimum amount of resin cracking and fissuring occurring on curing and with little, if any, undue stress being placed upon the electronic component.

Similarly, for potting applications, the polyether resins will not pull away from the wall of the container on curing as frequently occurs, for example, when polyester resins are cured. The minor amount of shrinkage which occurs when glycidyl polyether resins are cured probably explains their excellent adhesive properties as compared with other polar type resins. This in turn appears to account for the greater stiffness characteristic of glass laminates bonded with epoxy resins. Such resins adhere well to copper and have particularly good surface resistivity and satisfactory arc resistant properties whereby they are particularly suitable for use in preparing laminates for printed circuit applications.

In the past, glycidyl polyethers frequently have been cured to hard resins by heating the same in the presence of acid anhydride catalysts. When such acid anhydrides are so used it has been determined that relatively long gel times are required before a hardened product is obtained. In casting and potting applications this often results in settling of the fillers to the bottom of the casting or potting container before the resin has completely solidified. The long gelation time also adds to the cost of producing castings and laminates due to the relatively long period of time that such structures must be left in the mold or in the press.

Glycidyl polyethers, in addition to being difficult to cure satisfactorily using acid anhydrides alone, are considerably more expensive to use as casting and potting resins than are, for example, polyester resins. This is particularly true of the completely reactive, liquid varieties of glycidyl polyethers.

It now has been discovered that the various drawbacks, disadvantages, and limitations of glycidyl polyethers as set forth hereinabove can be overcome or substantially minimized by admixing certain liquid unsaturated reactive monomers and specific olefinic dicarboxylic acid anhydrides with the glycidyl polyethers and heating the resultant mixture in the presence of certain addition-type polymerization catalysts and critical amounts of certain tertiary amines.

The object of the present invention is to provide mixtures of glycidyl polyethers, unsaturated reactive monomers, and olefinic dicarboxylic acid anhydrides and certain tertiary amines which are stable for prolonged periods of time at room temperature and which will react readily when heated in the presence of certain addition-type polymerization catalysts to provide cured resinous products.

Another object of the invention is to provide a process for preparing cured resinous products by heating a glycidyl polyether in admixture with at least one liquid unsaturated reactive monomer, at least one olefinic dicarboxylic acid anhydride and a tertiary amine in the presence of certain addition-type polymerization catalysts.

Still another object of this invention is to provide electrical members insulated with a cured resinous composition comprising the reaction product of a glycidyl polyether, at least one liquid unsaturated reactive monomer, at least one olefinic dicarboxylic acid anhydride, and at least one tertiary amine.

In accordance with the present invention and in the attainment of the foregoing objects there are provided completely reactive resinous compositions comprising (1) 1 mol of a glycidyl polyether of a dihydric phenol, (2) an olefinically unsaturated dicarboxylic acid anhydride in an amount sufficient to provide approximately a stoichiometric number of anhydride groups to react with the epoxy and hydroxyl groups in said glycidyl polyether, (3) at least one liquid unsaturated reactive monomer having the group >C=C<, there being employed at least 2 mols of said monomer for each mol of said anhydride, and (4) a tertiary amine. While it is preferred to employ a stoichiometric molar amount of the anhydride with respect to the epoxy and hydroxyl groups in the polyether, satisfactory results are obtained when the anhydride is employed in an amount within plus or minus 15 mol percent of the stoichiometric amount. The tertiary amine should be employed in an amount within the range of from 0.01% to 5% by weight, based on the total weight of the composition.

In preparing the resinous compositions of this invention a glycidyl polyether, either solid or liquid grade, is dissolved in a liquid unsaturated reactive monomer having the group >C=C< to form a fluid mixture. To this fluid mixture there then is added at least one unsaturated dicarboxylic acid anhydride and about 0.01% to 5.0% by weight, based on the total weight of the composition, of a tertiary amine. When for use, this mixture will thermoset on heating the same in the presence of at least one addition-type polymerization catalyst.

It is believed that the anhydride groups of the ethylenically unsaturated dicarboxylic acid anhydride react with the hydroxyl groups on the glycidyl polyether to form a half ester. This resultant half ester then co-polymerizes with the liquid unsaturated reactive monomer when the composition is admixed with an addition-type polymerization catalyst. The finished polymer is believed to be one molecular species and it is further believed that reaction occurs between the carboxyl and epoxy groups on the polymer chain.

It is believed that the tertiary amine serves the primary function of promoting formation of the half ester. As will be illustrated hereinafter in certain working examples, it is important that the half-ester be formed before substantial vinyl polymerization occurs. Therefore, when using relatively fast acting addition-type polymerization catalysts, they should be added after the tertiary amine has been introduced into the liquid composition.

The compositions of the present invention may be used as casting resins without any substantial quantity of any fillers contained therein settling out before the composition has cured completely to a solid. Furthermore, the castings can be removed after a short period of time in the mold and the members heated in an oven to complete the cure.

Similarly, in the case of laminates, only short press times are required and inexpensive after baking in ovens applied subsequently. When the compositions are used as potting resins they do not pull away from the sides of the container as do compositions wherein polyester-vinyl monomer compositions, alone, are used.

Glycidyl polyethers, when admixed with the other ingredients herein disclosed and cured, are particularly suitable for electrical insulating applications. Thus, they may be applied to electrical wires, cables, coils, windings and the like as potting, impregnating and coating resins and varnishes. Upon being subjected to heat, the resinous mixture is cured to form a hard, tough resinous mass.

These catalyzed glycidyl polyether compositions also may be employed for potting and casting applications. Laminated magnetic cores, for example, may be dipped in such liquid compositions, using vacuum and pressure impregnation if necessary, and the compositions will readily fill out all of the spaces between the laminations. On heating, the composition between the laminations rapidly cures to a hard, tough, adhesive binder holding the laminations in position to produce a solid core which is extremely resistant to de-lamination and may be cut into core segments without rupture. Electrical transformers, rectifiers, and electronic components of various kinds may be potted or cast within the completely reactive catalyzed glycidyl polyether compositions of this invention.

The resinous glycidyl polyethers employed in preparing the resinous molding compositions of the present invention may be prepared by reacting predetermined amounts of at least one polyhydric phenol and at least one epihalohydrin in an alkaline medium. Phenols which are suitable for use in preparing such resinous polymeric epoxides include those which contain at least two phenolic hydroxy groups per molecule. Polynuclear phenols which have been found to be particularly suitable include those wherein the phenol nuclei are joined by carbon bridges, such for example as 4,4'-dihydroxy-diphenyl-dimethylmethane (referred to hereinafter as bis-phenol "A"), 4,4'-dihydroxy-diphenyl-methyl methane and 4,4'-dihydroxy-diphenyl-methane. In admixture with the named polynuclear phenols, use also may be made of those polynuclear phenols wherein the phenol nuclei are joined by sulfur bridges, such for example as 4,4'-dihydroxy-diphenyl-sulfone. Examples of suitable polyhydric alcohols are glycerol, propylene glycol and 1,5-pentanediol.

While it is preferred to use epichlorohydrin as the epihalohydrin in the preparation of the resinous polymeric epoxide starting materials of the present invention, homologues thereof, for example, epibromohydrin and the like also may be used advantageously.

In the preparation of the resinous polymeric epoxides, aqueous alkali is employed to combine with the halogen of the epihalohydrin reactant. The amount of alkali employed should be substantially equivalent to the amount of halogen present and preferably should be employed in an amount somewhat in excess thereof. Aqueous mixtures of alkali metal hydroxides, such as potassium hydroxide and lithium hydroxide, may be employed although it is preferred to use sodium hydroxide since it is relatively inexpensive.

The product of the reaction, instead of being a single simple compound, is generally a complex mixture of glycidyl polyethers, but the principal product may be represented by the formula:

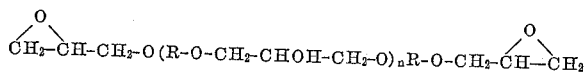

where $n$ is an integer of the series 0, 1, 2, 3 . . ., and R represents the divalent hydrocarbon radical of the dihydric phenol. While for any single molecule of the polyether $n$ is an integer, the fact that the obtained polyether is a mixture of compounds causes the determined value for $n$, from molecular weight measurement, to be an average which is not necessarily zero or a whole number. Although the polyether is a substance primarily of the above formula, it may contain some material with one or both of the terminal glycidyl radicals in hydrated form.

The resinous polymeric epoxide, or glycidyl polyether of a dihydric phenol suitable for use in this invention, has a 1,2-epoxy equivalency greater than 1.0. By epoxy equivalency reference is made to the average number of 1,2-epoxy groups.

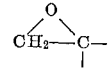

contained in the average molecule of the glycidyl ether. Owing to the method of preparation of the glycidyl polyethers and the fact that they are ordinarily mixtures of chemical compounds having somewhat different molecular weights and contain some compounds wherein the terminal glycidyl radicals are in hydrated form, the epoxy equivalency of the product is not necessarily the integer 2.0. However, in all cases it is a value greater than 1.0. The 1,2-epoxy equivalency of the polyethers is thus a value between 1.0 and 2.0.

The 1,2 epoxide value of the glycidyl polyether is determined by heating a weighed sample of the ether with an excess of 0.2 N pyridinium chloride in chloroform solution at the boiling point under reflux for 2 hours whereby the pyridinium chloride hydrochlorinates the epoxy groups to chlorohydrin groups. After cooling, the excess pyridinium chloride is back-titrated with 0.1 N sodium hydroxide in methanol to the phenolphthalein end point.

Resinous polymeric epoxides or glycidyl polyethers suitable for use in accordance with this invention may be prepared by admixing and reacting from one to two mol proportions of epihalohydrin, preferably epichlorohydrin, with about one mol proportion of bis-phenol "A" in the presence of at least a stoichiometric excess of alkali based on the amount of halogen.

To prepare the resinous polymeric epoxides, aqueous alkali, bis-phenol "A" and epichlorohydrin are introduced into and admixed in a reaction vessel. The aqueous alkali serves to dissolve the bis-phenol "A" with the formation of the alkali salts thereof. If desired, the aqueous alkali and bis-phenol "A" may be admixed and the epichlorohydrin added thereto, or an aqueous solution of alkali and bis-phenol "A" may be added to the epichlorohydrin. In any case, the mixture is heated in the vessel to a temperature within the range of about 80° to 110° C. for a period of time varying from about one-half hour to three hours, or more, depending upon the quantities of reactants used.

Upon completion of heating, the reaction mixture separates into layers. The upper aqueous layer is withdrawn and discarded, and the lower layer is washed with hot water to remove unreacted alkali and halogen salt, in this case, sodium chloride. If desired, dilute acids, for example, acetic acid or hydrochloric acid, may be employed during the washing procedure to neutralize the excess alkali.

Glycidyl polyethers in either solid or liquid form may be used in this invention. The commercially available polyethers which are solids are less expensive than the liquid grades, thus the use of the solid materials affords a substantial cost savings when used in accordance with this invention. The liquid polyethers have very few, if any, hydroxyl groups. The solid polyethers, on the other hand, have a substantial number of hydroxyl groups per molecule.

The following example illustrates the preparation of a glycidyl polyether suitable for use in preparing the resinous molding compositions of this invention.

Example I

Fifty-four parts of sodium hydroxide were dissolved in about 600 parts of water in an open kettle provided with a mechanical stirrer. About 3 mols of bis-phenol "A" were added and the resultant mixture was stirred for about 10 minutes at a tempearture of about 30° C. Thereafter, approximately 4 mols of epichlorohydrin were added, whereupon the temperature of the resultant mixture increased to about 60° C. to 70° C. due to the heat of reaction. About 42 parts of caustic soda dissolved in about 9 parts of water then were added with continuous stirring and the mixture was maintained at a temperature of about 90° C. to 100° C. for a period of about 1 hour. The mixture then was permitted to separate into two layers. The upper layer was withdrawn and discarded and the lower layer was washed with boiling water to which was added acetic acid in an amount sufficient to neutralize unreacted caustic soda. The liquid resinous reactive polymeric epoxide was obtained after substantially all of the wash water had been removed.

In addition to the glycidyl polyethers described hereinabove, this invention also is applicable to epoxynovalac resins, diepoxide resins such as dicyclopentadiene dioxides, vinylcyclohexene dioxide, limonene dioxide, and the like. These resins may be employed singly or in mixtures of two or more.

Examples of liquid reactive unsaturated monomers having the group >C=C< which are suitable for use in accordance with this invention, include monostyrene, vinyl toluene, alphamethylstyrene, 2,4-dichlorostyrene, paramethyl styrene, vinyl acetate, methyl methacrylate, ethyl acrylate, methyl vinyl ketone, and butyl methacrylate, as well as mixtures of any two or more of these monomers.

Examples of suitable olefinically unsaturated dicarboxylic acid anhydrides which may be employed in accordance with the present invention include maleic anhydride, citraconic anhydride, itaconic anhydride, chloromaleic anhydride, and the like. These anhydrides may be used singly or in mixtures of two or more. The above anhydrides may be replaced, in part, by other anhydrides such as methylated maleic acid adducts of phthalic anhydride (methyl nadic) or dodecenyl succinic anhydride, hexahydrophthalic anhydride, chlorendic anhydride, and the like.

The resinous compositions of this invention may be admixed with suitable solid fillers such as aluminum hydroxide, silica, titanium dioxide, wollastonite, glass fibers, wood flour, mica, graphite, calcium silicate, and the like. These fillers preferably are used in finely divided form and may be used singly or in combinations of two or more.

The resinous compositions of this invention also contain a tertiary amine. Examples of suitable tertiary amines which may be employed include dimethyl aniline, N,N-dimethylbenzylamine, triethanolamine, alphamethyl benzyl dimethylamine, and the like. These amines may be used singly or in combinations of two or more.

The resinous compositions of this invention will cure to solid, tough products on heating to temperatures up to 150° C. in the presence of at least one addition-type polymerization catalyst. Examples of such catalysts include benzoyl peroxide, lauroyl peroxide, methyl ethyl ketone peroxide, t-butyl hydroperoxide, ascaridole, tert-butyl perbenzoate, di-t-butyl diperphthalate, ozonides, and similar catalysts in an amount ranging from about 0.1% to about 2% by weight of the total resinous composition, although somewhat larger or smaller amounts may be employed if desired.

In order to indicate even more fully the advantages and capabilities of the resinous compositions of the present invention, the following examples are set forth. The parts given are by weight unless otherwise indicated.

*Example II*

About 10 parts of a solid glycidyl polyether, which may be produced in accordance with Example I, having an epoxide equivalent of 450–525 and having 2-3 hydroxyl groups per molecule and an approximate epoxide equivalent of 130, and a melting point of 64° to 76° C. is dissolved in about 6 parts of monostyrene with 3 parts of maleic anhydride and 1% by weight, based on the total weight of the liquid composition, of ditertiary butyl peroxide. The resultant solution was heated overnight at 80° C. to give a cloudy, brittle, solid resin. After an additional overnight bake at 135° C., the resin was opaque and brittle. It will be noted that this composition did not contain any tertiary amine.

*Example III*

Example I was repeated with the exception that 0.5% by weight, based on the total weight of the resinous composition, of dimethyl aniline was added thereto. After an overnight bake at 80° C., a transparent, rigid, and tough resinous product was obtained. This demonstrates the improvement in properties of the finished resin obtainable by the incorporation therein of a relatively small amount of a tertiary amine.

Examples IV and V demonstrate the importance of adding the polymerization addition-type catalyst some hours, e.g., about 2 to 15 or more hours, after the tertiary amine has been added to the liquid resinous mixture, if clear, hard, tough resinous castings are desired.

*Example IV*

The following ingredients were admixed to form a liquid solution:
| | | |
|---|---|---|
| Epoxy resin of Example I | parts | 10 |
| Monostyrene | do | 6 |
| Maleic anhydride | do | 3 |
| Benzoyl peroxide | percent by weight | 0.5 |
| Dimethyl aniline | do | 0.5 |

The dimethyl aniline was added last whereupon a red solution was obtained that gelled within 2 to 3 minutes at room temperature. After an overnight bake at 80° C. followed by a second overnight bake at 135° C., the resin was opaque, hard and brittle.

*Example V*

The previous example was repeated with the exception that the benzoyl peroxide catalyst was not added to the solution until after it had an opportunity to stand overnight. The resin then gelled in 5 minutes at room temperature. It was baked overnight at 80° C., followed by a second overnight bake at 135° C. The resultant resinous composition was transparent and tough.

*Example VI*

Physical properties were determined on unfilled resin solutions cast from the following formulation:
| | | |
|---|---|---|
| Epoxy of Example I | parts | 10 |
| Monostyrene | do | 8 |
| Maleic anhydride | do | 1 |
| Chlorendic anhydride | do | 1.39 |
| Hexahydrophthalic anhydride | do | 4.2 |
| Dimethyl aniline | percent by weight | 0.5 |
| Ditertiary butyl peroxide | do | 1.5 |

The resin was gelled at room temperature, followed by baking for 1½ days at 80° C., one day at 100° C. and 16 hours at 135° C. The physical properties of the cured resin were as follows:
| | | |
|---|---|---|
| Flexural strength | p.s.i. | 19,525 |
| Barcal hardness | | 35 |
| Tensile strength | p.s.i. | 10,105 |
| Heat distortion point (high load) | °C | 102 |
| Izod impact in ft. lbs./in. of notch | | 0.55 |
| Compressive strength | p.s.i. | 17,065 |

These properties indicate that toughness of the compositions of this invention. The compositions are not brittle and do not crack or shatter during handling or use.

The following examples are illustrative of other formulations which may be prepared in accordance with the present invention.

Example VII

| | |
|---|---|
| Epoxy resin _____parts__ | 9 |
| Vinyl toluene _____do____ | 7 |
| Citraconic anhydride _____do____ | 3 |
| Triethanolamine _____percent by weight__ | 2.0 |
| Benzoyl peroxide _____do____ | 0.5 |

Example VIII

| | |
|---|---|
| Epoxy resin _____parts__ | 10 |
| Vinyl acetate _____do____ | 8 |
| Itaconic anhydride _____do____ | 3 |
| N,N-dimethyl benzylamine _____percent by weight__ | 1.5 |
| Tertiary butyl hydroperoxide _____do____ | 1.0 |

While the present invention has been described with reference to certain specific embodiments thereof it will be understood, of course, that certain changes, substitutions, modifications, and the like may be made therein without departing from its true scope.

I claim as my invention:

1. A completely reactive resinous composition comprising (1) the half ester of one mol of a hydroxyl-containing glycidyl polyether of a dihydric phenol and an ethylenically unsaturated dicarboxylic acid anhydride, said unsaturated dicarboxylic acid anhydride having been present originally in an amount sufficient to provide approximately a stoichiometric number of anhydride groups to react with the epoxy and hydroxyl groups in said glycidyl polyether, (2) at least one liquid unsaturated reactive monomer having the polymerizable group $>C=C<$, there being employed at least 2 mols of said monomer for each mol of said anhydride, and (3) a tertiary amine.

2. A completely reactive resinous composition comprising (1) the half ester of one mol of a glycidyl polyether of a dihydric phenol and maleic anhydride, (2) at least one liquid unsaturated reactive monomer having the polymerizable group $>C=C<$, there being employed at least 2 mols of said monomer for each mol of said anhydride, and (3) a tertiary amine.

3. A completely reactive resinous composition comprising (1) the half ester of one mol of a hydroxyl-containing glycidyl polyether of a dihydric phenol and an ethylenically unsaturated dicarboxylic acid anhydride in an amount sufficient to provide approximately a stoichiometric number of anhydride groups to react with the epoxy and hydroxyl groups in said glycidyl polyether, (2) monostyrene, and (3) a tertiary amine.

4. A completely reactive resinous composition comprising (1) the half ester of one mol of a hydroxyl-containing glycidyl polyether of a dihydric phenol and an ethylenically unsaturated dicarboxylic acid anhydride in an amount sufficient to provide approximately a stoichiometric number of anhydride groups to react with the epoxy and hydroxyl groups in said glycidyl polyether, (2) at least one liquid unsaturated reactive monomer having the polymerizable group $>C=C<$, there being employed at least 2 mols of said monomer for each mol of said anhydride, and (3) dimethyl aniline.

5. A completely reactive resinous composition comprising (1) the half ester of one mol of a glycidyl polyether of a dihydric phenol and maleic anhydride, (2) monostyrene, there being employed at least 2 mols of monostyrene for each mol of maleic anhydride, and (3) dimethyl aniline.

6. A tough, thermoset resinous body derived by curing a completely reactive resinous composition comprising (1) the half ester of one mol of a hydroxyl-containing glycidyl polyether of a dihydric phenol and an ethylenically unsaturated dicarboxylic acid anhydride, said unsaturated dicarboxylic acid anhydride having been present originally in an amount sufficient to provide approximately a stoichiometric number of anhydride groups to react with the epoxy and hydroxyl groups in said glycidyl polyether, (2) at least one liquid unsaturated reactive monomer have the polymerizable group $>C=C<$, there having been employed at least 2 mols of said monomer for each mol of said anhydride, (3) a tertiary amine, and curing the resinous composition by heat in the presence of at least one addition type polymerization catalyst.

References Cited in the file of this patent

UNITED STATES PATENTS

| 2,848,433 | Eirich _____ | Aug. 19, 1958 |
| 3,003,981 | Wear _____ | Oct. 10, 1961 |
| 3,015,577 | Sacher _____ | Jan. 2, 1962 |

OTHER REFERENCES

Lee et al.: "Epoxy Resins," pages 94–96 and 116–118, 1957, McGraw-Hill, New York.